May 19, 1925. 1,538,170

R. CRAMP

INSTRUMENT FOR THE APPLICATION OF SHAVING CREAM OR THE LIKE

Filed June 9, 1924

Inventor
RICHARD CRAMP,
By Toulmin & Toulmin,
ATTORNEYS

Patented May 19, 1925.

1,538,170

UNITED STATES PATENT OFFICE.

RICHARD CRAMP, OF LONDON, ENGLAND, ASSIGNOR TO JOHN KNIGHT LIMITED, OF LONDON, ENGLAND.

INSTRUMENT FOR THE APPLICATION OF SHAVING CREAM OR THE LIKE.

Application filed June 9, 1924. Serial No. 718,824.

*To all whom it may concern:*

Be it known that I, RICHARD CRAMP, of London, England, a subject of the King of Great Britain and Ireland, have invented certain new and useful Instruments for the Application of Shaving Cream or the like, of which the following is a specification.

This invention relates to a device for the application of shaving cream to the skin.

A device or instrument made in accordance with this invention comprises a casing adapted to be screwed on to the neck of a collapsible tube or other similar container. A roller provided with a spindle carried on a bearing wheel which is elongated to permit of transverse movement, the roller projecting from the face of the casing.

Referring to the drawings filed herewith:—

Figure 1:
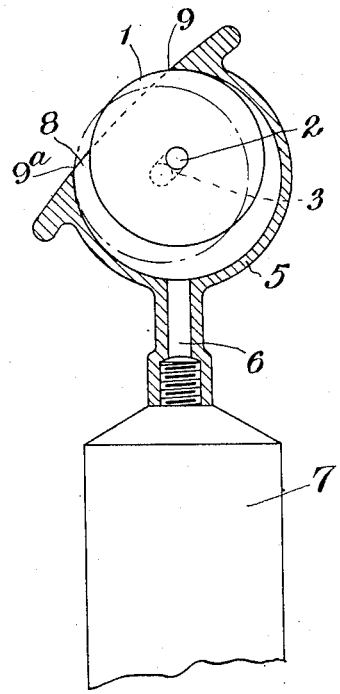
Fig. 1 is an end sectional elevation of one form of device made in accordance with this invention.
Figure 2:
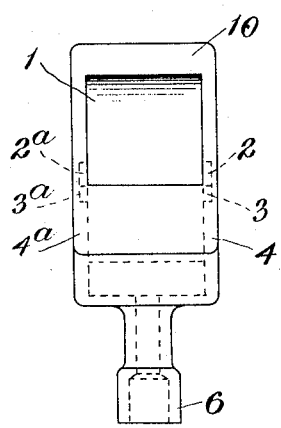
Fig. 2 is a side view of the device.

In Fig. 1, 1 is a roller fitted with pivots 2 and 2ª which are free to rotate in the elongated holes 3 and 3ª, formed in the side plates 4 and 4ª of the casing 5, the said casing being provided with an inlet 6 which is suitably threaded so as to be screwed on to the tube of cream 7; to operate the device the tube 7 is compressed whereby the cream it contains will be ejected into the casing 5, automatically pressing the roller 1 upwards and filling the space between the outer periphery of the said roller and the inner wall of the casing 5; when this is filled the cream will be ejected through the aperture 8 in a clockwise direction laying on and round the periphery of the roller 1, with any desired thickness according to the width between the periphery of the roller 1 and the lip 9ª formed in the casing 5; if now the face 10 of the device be applied to the skin and drawn in a downward direction, the roller will revolve clockwise applying the cream which is thus scraped from the periphery of the roller 1 by the lip 9. An upward movement of the device will cause the roller 1 to revolve in an anticlockwise direction, and in so doing the roller 1 acting along the elongated slots 3 and 3ª will cause the periphery of the said roller to be in close proximity with the lip 9ª as shown dotted, Fig. 1. The cream will then be protruded through the aperature between the roller 1 and the lip 9, a continuous upward and downward movement of the device will cause the said roller to revolve, clockwise, and anticlockwise, whipping the cream into a suitable consistency smearing automatically the periphery of the said roller and causing the cream to be applied and spread in a thin film like consistency. To replenish the casing 5 the tube 7 is again squeezed, and the cycle of operation repeated until sufficient cream is applied.

What I claim and desire to secure by Letters Patent is:—

A device for the application of shaving cream comprising a casing, a slotted bearing in the casing, means for attaching the casing to a collapsible tube, said casing having a passage communicating with the tube, a roller provided with trunnions adapted to bear in said slotted bearings, said roller projecting from the face of the casing and adapted to alternately bear against the upper and lower edges of the slot so as to permit the said edges scraping the cream from the periphery of the said roller and alternately leaving a space between the opposite edge of the casing and said roller through which the shaving cream may be ejected to spread on to the periphery of the said roller according to the direction in which the roller is moved over the skin.

In testimony whereof, I affix my signature.

RICHARD CRAMP.